United States Patent [19]

Sigg

[11] Patent Number: 4,489,816
[45] Date of Patent: Dec. 25, 1984

[54] CLUTCH ARRANGEMENT FOR A MARINE VESSEL DRIVE

[75] Inventor: Hans Sigg, Mutschellen, Switzerland

[73] Assignee: MAAG Gear-Wheel & Maschine Company Limited, Zurich, Switzerland

[21] Appl. No.: 364,424

[22] Filed: Apr. 1, 1982

[30] Foreign Application Priority Data

Apr. 13, 1981 [CH] Switzerland ............ 2431/81

[51] Int. Cl.³ .............. F16D 47/06; F16D 39/00; F16D 11/10; F16D 23/10
[52] U.S. Cl. ................... 192/3.23; 192/3.33; 192/35; 192/53 H; 192/67 A; 192/94; 192/109 F
[58] Field of Search ............ 192/67 A, 109 F, 35, 192/36, 53 G, 53 H, 94, 3.23, 3.24, 3.33

[56] References Cited

U.S. PATENT DOCUMENTS

| 3,196,703 | 7/1965 | Sinclair et al. | 192/53 H |
|---|---|---|---|
| 3,272,295 | 9/1966 | Clements | 192/67 A |
| 3,818,776 | 6/1974 | Prenzel et al. | 192/109 F |
| 3,904,006 | 9/1975 | Clements | 192/67 A |

*Primary Examiner*—George H. Krizmanich
*Attorney, Agent, or Firm*—Werner W. Kleeman

[57] ABSTRACT

A drive shaft is connected with one coupling half of a synchronizing tooth clutch and with a primary part of a fluid coupling. A driven shaft is connected with another clutch half of the tooth clutch and with a secondary part of the fluid coupling. The tooth clutch has a clutch star which is axially displaceably guided by a first straight tooth system at the one clutch half by continuous tooth mesh and can be engageable with a second straight tooth system provided at the second clutch half. Threadably connected with the second clutch half a is also connected by a ratchet with the clutch star and is conjointly axially displaceable therewith. The ratchet engages and causes a screw-like relative movement of the screw socket in relation to the second clutch half causing of the clutch star to engage, when the rotational speed of the first clutch half, in normal forward rotation, is about to fall below the rotational speed of the second clutch half. This has advantage that for engaging the tooth clutch the rotational speed of the drive shaft need not drop below the rotational speed of the driven shaft. The time span, during which in synchronizing and engaging the tooth clutch power transmission, is interrupted is appreciably shortened. No special measures or facilities are required for protecting the ratchet.

10 Claims, 9 Drawing Figures

CLUTCH ARRANGEMENT FOR A MARINE VESSEL DRIVE

BACKGROUND OF THE INVENTION

The present invention relates to a new and improved construction of a clutch arrangement for a marine vessel drive or propulsion system.

Generally speaking, the clutch arrangement for the marine vessel drive or propulsion system of the present development is of the type comprising a normally driving or drive first shaft which is connected by means of a first drive-side toothed clutch half of a synchronizing jaw or tooth clutch as well as with a primary part of a fluid coupling or a fluid or torque converter. There is also provided a normally driven second shaft which is connected with a power take-off side toothed clutch half of the tooth clutch as well as with a secondary part of the fluid coupling or the fluid or torque converter. The tooth or jaw clutch possesses a clutch star which, by means of a first tooth system at one of the toothed clutch halfs, is axially displaceably guided by continuous meshing of the teeth and can be engaged by a second tooth system with the second clutch half and carries a pawl blocking device. This pawl blocking device engages upon passing through a synchronous rotational speed and causes a screw-like relative movement of two parts or components of the tooth clutch which causes the engagement of the clutch star.

A state-of-the-art clutch arrangement of this type has been disclosed in the article of E. Fortunato and H. A. Clements, entitled "Marine Reversing Gear Incorporating Single Reversing Hydraulic Coupling and Direct-Drive Clutch for Each Turbine", appearing in the 1979 publication of ASME. With such prior art clutch arrangement the continuously meshing teeth of the clutch star and the one clutch half are constructed as helical teeth, so that the clutch star can be directly threaded onto this one clutch half, and thus, can be engaged with its second tooth system in the second clutch half. The pawl blocking device consists of a ring-shaped pawl support attached at the clutch star and containing pawls mounted thereat and a pawl tooth system formed at the second clutch half into which there can engage the pawls. With completely disengaged tooth or jaw clutch the pawl support assumes an axially offset position in relation to the pawl teeth, at which the pawl blocking device is completely ineffective and during forward rotation of the first shaft renders possible both forward rotation as well as reverse rotation of the second shaft. Secured to the second shaft is a bearing ring upon which there is mounted a brake ring in such a manner that the friction prevailing between both rings strives to retain the brake ring at the rotational speed of the second shaft. The brake ring possesses helical teeth into which there axially displaceably engage helical teeth formed at the pawl support. These helical teeth convert the braking moment transmitted from the bearing ring to the brake ring into an axial force which is effective at the pawl support. This axial force strives to retain the pawl blocking device in its ineffectual position as long as the second shaft rotates forwardly at a smaller velocity than the first shaft or the second shaft is stationary or rotates backwards.

In order to initiate an engagement operation of the known jaw or tooth clutch, the clutch star can be shifted, and along therewith the pawl support by means of a servomotor, in such a manner that the pawls come into engagement with the pawl teeth. However, such displacement must be positively prevented during the normal operating state of the fluid or hydraulic coupling, when the drive shaft rotates at a greater angular velocity than the power take-off shaft, since otherwise the pawl blocking device can be damaged. It is for this reason that there is operatively correlated with the clutch arrangement a measuring and control device which continuously monitors and compares the angular velocities of both shafts and only then allows for actuation of the servomotor when the rotational speed of the first shaft drops below that of the second shaft. If the tooth or jaw clutch should be engaged it is thus always necessary to brake the first shaft, and along therewith the related drive machine, to an angular velocity below that retained by the second shaft during ahead travel of the vessel because of the propellor thrust. Only then is it possible for the servomotor to displace the clutch star together with the pawl support into an intermediate position where the pawls can coact with the pawl teeth and initially ratchet thereover. Thereafter, if the drive machine is gradually again speeded-up, then the pawls engage with the pawl teeth and prevent the pawl support together with the clutch star, from assuming in conjunction with the drive shaft an angular velocity which is greater than that of the power take-off shaft. The clutch star thus remains in its angular velocity behind that of the drive shaft, so that the clutch star can be displaced in the engaging sense by the intermeshing helical teeth which connect such with the first clutch half, until the second teeth or tooth system of the clutch star has engaged with the second clutch half and the clutch star has reached an impact or contact position.

The necessity of braking the first shaft, and thus the entire drive machine, in the described manner before the synchronization operation can begin with gradually again increasing angular velocity of the drive shaft, constitutes an appreciable loss in time which can arise already at an initial or pre-phase of the engagement of the tooth or jaw clutch. This loss in time can significantly reduce the mobility of a marine vessel equipped with the prior art clutch arrangement. In the event that the servomotor brings the pawl blocking device into engagement prior to the angular velocity of the first shaft having been sufficiently lowered, for instance because of failure of the described control device, then the pawl blocking device will be damaged. Consequently, the tooth or jaw clutch will be unusable and the marine vessel drive or propulsion system must be shutdown in order to avoid even greater damage.

SUMMARY OF THE INVENTION

Therefore, with the foregoing in mind it is a primary object of the present invention to provide a new and improved construction of a clutch arrangement for a marine vessel drive which is not associated with the aforementioned drawbacks and limitations of the prior art constructions.

Another and more specific object of the present invention aims at the provision of a new and improved construction of a clutch arrangement of the previously described type which is designed such that the tooth or jaw clutch can engage more rapidly and without endangering the pawl blocking device.

Still a further significant object of the present invention aims at a new and improved construction of a clutch arrangement for a marine vessel drive, which is relatively simple in construction and design, extremely reliable in operation, not readily subject to breakdown or malfunction, and requires a minimum of maintenance and servicing.

Now in order to implement these and still further objects of the invention, which will become more readily apparent as the description proceeds, the tooth or jaw clutch which is basically of conventional construction, is manifested by the features that the first teeth or tooth system of the clutch star is constituted by straight teeth. A screw socket is threadably or screw connected with the second clutch half. This screw socket and the ratchet or pawl blocking device are connected as a unit with the clutch star for conjoint axial displacement. A servomotor controlled by the screw socket is provided for continuing the engaging movement. The pawl blocking device is arranged such that it engages when the rotational speed of the drive-side clutch half, during normal forward rotational direction, is in the process of dropping below the rotational speed of the power take-off side clutch half.

A further tooth or jaw clutch of the previously described type is known from German Pat. No. 1,181,992 published July 8, 1965 (equivalent to U.S. Pat. No. 3,154,181, granted Oct. 27, 1964). Here the clutch star essentially possesses the shape of a tubular element or section which is provided at both of its ends with a respective set of straight internal or inner teeth, one set of internal teeth continuously meshing with straight outer or external teeth formed at the drive shaft and the other set of internal teeth being engageable with external or outer teeth formed at the driven shaft. Approximately at the central region between both of the internal teeth there is arranged at the inner side of the tubular element a pawl tooth system likewise constructed as internal teeth. Since such total of three sets of teeth are located in cross-section at the apexes of a triangle such type of arrangement has been designated in the art as a clutch star, this designation having also been conveniently adopted in the specification of the instant invention, without it being crucial to the invention whether the teeth of the clutch star coacting with a respective clutch half are constituted by internal teeth or external teeth. The same is correspondingly true also for the pawl teeth, wherein in the context of the disclosure of the present invention, it is not in any way decisive whether such are constructed as internal teeth or external teeth at the clutch star or at the screw socket. It should be understood that the pawls of the pawl blocking device are mounted at the screw socket when the pawl teeth are formed at the clutch star and vice versa.

With the synchronizing jaw or tooth clutch known from the aforementioned German Patent No. 1,181,992, and just as was the case for the jaw or tooth clutch known from the previously referred to ASME-publication, the pawl blocking device is arranged such that it engages when the rotational speed of the drive-side clutch half, during normal forward rotational direction, is in the process of exceeding the rotational speed of the power take-off side clutch half.

With the invention there is achieved the result that for engaging the synchronizing jaw or tooth clutch the rotational speed of the normally driving first shaft practically need not be dropped below the rotational speed of the normally driven second shaft, since as soon as the first-mentioned rotational speed is merely in the process of dropping below the second-mentioned rotational speed does the pawl blocking device become effective and forces the screw socket to rotate in conjunction with the clutch star and the first clutch half which is continuously in tooth meshing engagement therewith, and thus, causes a relative rotation in relation to the second clutch half, and hence, a screw-like movement. During such screw or threading movement the screw socket, on the one hand, entrains—possibly after overcoming a more or less large axial play—the clutch star in axial direction and, on the other hand, controls—either directly or by means of the clutch star—the servomotor such that the servomotor moves the clutch star completely into its engaged position. Directly thereafter the rotational speed of the normally and now again driving first shaft is again increased by running-up the drive machine, without such rotational speed at any time appreciably having dropped below the original rotational speed of the second shaft. The time span, during which, upon synchronization and engagement of the jaw clutch, the power transmission from the drive machine to the second shaft has been interrupted, is therefore appreciably shortened with the inventive clutch arrangement in comparison to the state-of-the-art.

A further decisive advantage of the inventive clutch arrangement in relation to the state-of-the-art arrangement of the previously described type resides in the fact that, there are not required special measures or facilities for protecting the pawl blocking device, since the pawls are never shifted in axial direction in relation to the pawl teeth, and thus, are not exposed to the danger of being damaged or even possibly destroyed by an actuation operation which occurs at an improper point in time. Although the pawl blocking device, with the inventive arrangement, always remains ready to be engaged, the tooth or jaw clutch, in the disengaged condition, accommodates itself to any random slip which may arise in the then effective fluid coupling. The pawls simply then ratchet away over the pawl teeth. The same is true if, during normal forward rotation of the first shaft, the second shaft rotates in reverse. In such case the pawls ratchet correspondingly more quickly over the pawl teeth, without thereby becoming damaged.

Just as is the case for the known clutch arrangements, it is advantageous if not absolutely essential for the purpose of protecting the mutually axially movable teeth when disengaging the jaw or tooth clutch if the drive machine is temporarily switched to partial load or even to idle. Thus, with the known clutch arrangements the normally driving shaft can be braked to such an extent that its rotational speed drops directly after the disengagement of the tooth or jaw clutch below the rotational speed of the normally driven shaft. This must be avoided with the inventive clutch arrangement since otherwise the pawl blocking device would engage and in conjunction with the screw socket immediately produce an axial force in the engaging sense. Therefore, with the inventive clutch arrangement, the tooth or jaw clutch is preferably disengaged under partial load, and in this connection the idle state of the drive machine also is to be understood as still constituting partial load, since the drive machine can still be delivering an output in the order of about 5% of its rated load.

In order to prevent the teeth which come out of engagement during disengagement of the jaw or tooth clutch under partial load from being damaged because of the impossibility, imposed by the inventive clutch arrangement, of breaking the first shaft to a rotational speed below that of the second shaft, it is contemplated according to a further development of the invention to arrange forwardly of the servomotor an accumulator. In the accumulator there can be stored a quantity of energy which is sufficient for a sudden disengagement of the tooth or jaw clutch during partial load operation of the clutch arrangement. Consequently, there can be shortened the effective duration in which excessive surface pressures prevail at the teeth which come out of engagement, so that damage to the teeth can be avoided.

With the same objective it is contemplated according to a further measure, constituting an additional measure of the invention, to design the second teeth of the clutch star, in other words those which are disengaged during clutch disengagement from the related teeth of the second clutch half, so as to possess a diameter which is greater by 50 to 150%, preferably 80 to 120%, than that of the first teeth of the clutch star which are continuously in engagement with the related teeth of the first clutch half.

The invention can be particularly advantageously employed with clutch arrangements of the previously described type, whose fluid coupling can be reversed. Above all, with such fields of application, it is advantageous if the pawl blocking device contains an oil dam-up facility or means which dampens the movement of the pawls when such ratchet away over the related pawl teeth, especially during reverse travel of the second shaft. Preferably, dam-up discs are arranged to both sides of the pawl teeth and which form the build-up or dam-up of the oil.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
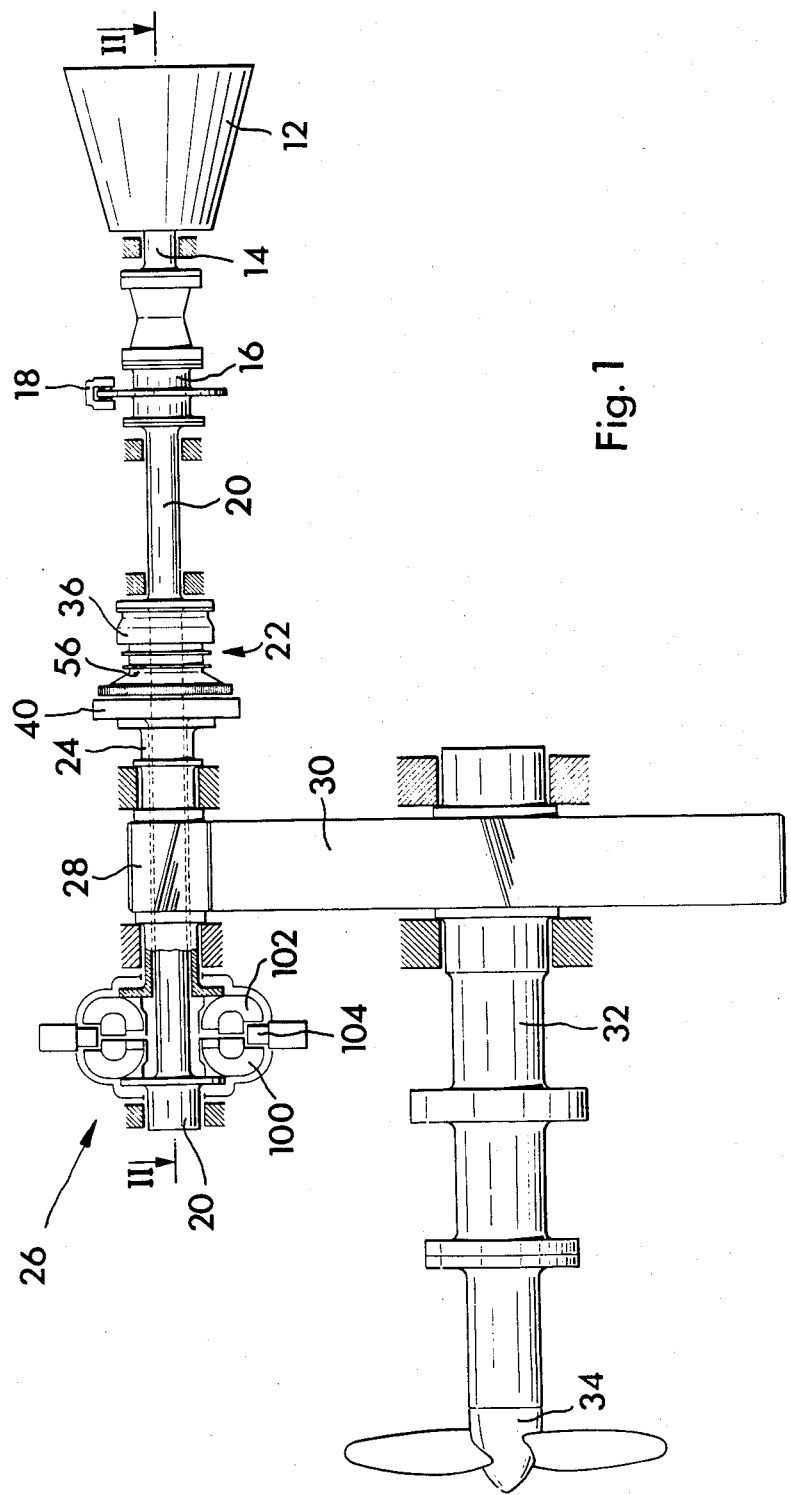
FIG. 1 is a top plan view of a marine vessel drive or propulsion system, partially shown in longitudinal sectional view.

Describing now the drawings, with respect to the marine vessel propulsion system or drive shown by way of example in FIG. 1, such will be seen to contain a drive machine 12, in the illustrated exemplary embodiment, constituted by a gas turbine whose drive shaft 14 is operatively coupled with a brake body 16. The related brake or brake element 18 of such brake body 16 has only been schematically shown. Coupled with the brake body 16 is a normally driving first shaft 20—the drive shaft—which can be coupled by means of a synchronizing jaw or tooth clutch 22 or equivalent structure with a normally driven second shaft 24. The first drive shaft 20 extends through the second driven shaft 24 which is constructed as a hollow shaft and is also operatively coupled therewith by means of a fluid coupling 26. Between the jaw or tooth clutch 22 and the fluid coupling 26 there is secured a pinion 28 to the second driven shaft 24. This pinion 28 meshes with a gear 30. The gear 30 is attached to a propeller shaft 32 at which there is flanged or bolted or otherwise appropriately affixed the ship's propeller 34.

Figure 3:
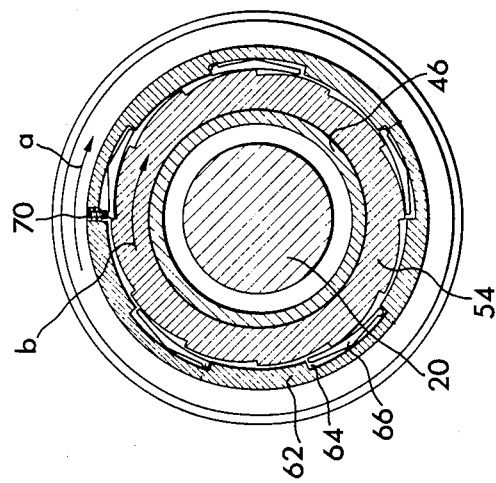
FIG. 3 is a cross-sectional view of the arrangement of FIG. 2, taken substantially along the line III—III thereof.
Figure 2:
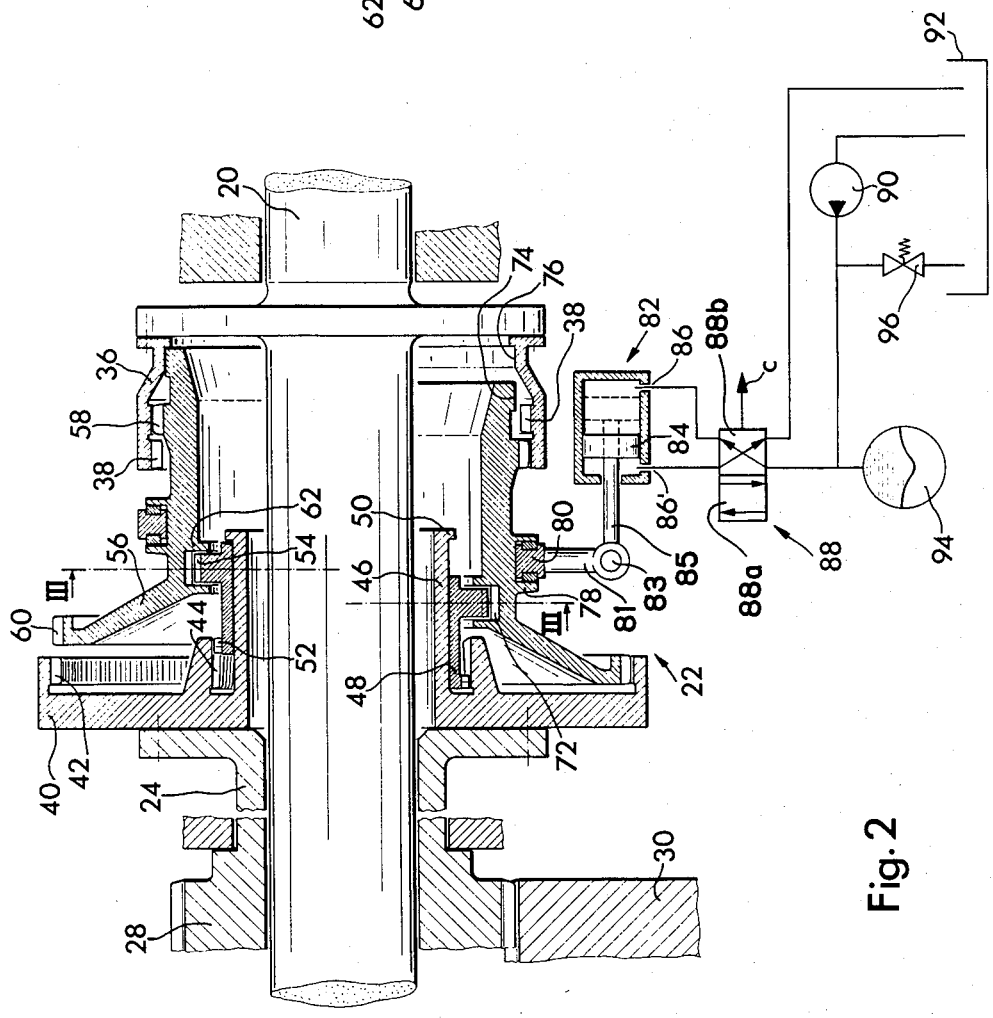
FIG. 2 is an enlarged longitudinal sectional view, taken substantially along the line II—II of FIG. 1, and showing further details.

The synchronizing tooth or jaw clutch 22, as best seen by referring to FIGS. 2 and 3, possesses a drive-side clutch half or portion 36 equipped with straight gear teeth or a straight tooth system 38 which, in the illustrated exemplary embodiment, is constructed as inner or internal teeth, as well as a power take-off side arranged clutch half or portion 40 equipped with straight gear teeth or a straight tooth system 42 which, in the illustrated exemplary embodiment, likewise is constructed as inner or internal teeth. The pitch circle diameter of the teeth 42 of the power take-off side arranged clutch half 40 is appreciably greater, in the illustrated exemplary embodiment by about 80%, than the pitch circle diameter of the teeth 38 of the drive-side clutch half 36.

At the power take-off side clutch half or portion 40 there is formed, radially within the straight teeth 42, a set of helical teeth or a helical tooth system 44, which in the illustrated exemplary embodiment likewise constitutes internal or inner teeth. Protruding away from the power take-off side clutch half 40 in the direction of the drive-side clutch half 36, and arranged coaxially with respect to the teeth 42 and 44, is a guide sleeve or bushing 46 upon which there is axially displaceably guided for limited movement a screw socket or collar 48. The displacement path of the screw socket 48 is limited, on the one hand, by the power take-off side clutch half 40 itself and, on the other hand, by a collar member 50 formed at the end of the guide bushing or sleeve 46. The screw socket 48 is provided with helical teeth or a helical tooth system 52 which engages in every possible axial position of the screw socket 48 with the helical teeth 44 of the power take-off side clutch half 40. The helix angle of the helical teeth 44 and 52 is chosen such that any relative rotation of the screw socket 48 in relation to the power take-off side clutch half 40 causes an axial relative displacement, and thus, the screw socket 48 is free of jamming or self-locking in relation to torque.

Formed at the screw socket 48 is a pawl tooth system or pawl teeth 54, and in the illustrated embodiment such are constituted by external or outer teeth. Such external pawl teeth 54 are enclosed by a clutch star or star member 56 which is sleeve-like but in axial sectional view possesses a star-shaped configuration. The clutch star 56 has a first set of straight teeth 58 which continuously mesh, but however are axially displaceable, with the straight teeth 38 of the drive-side clutch half 36, and therefore in the illustrated exemplary embodiment have been constructed as external teeth. Furthermore, the clutch star 56 has a second set of straight teeth 60 which can be engaged with the internal straight teeth 42 of the power take-off side clutch half 40, and therefore, in the illustrated exemplary embodiment are constructed as external teeth.

Figure 4:
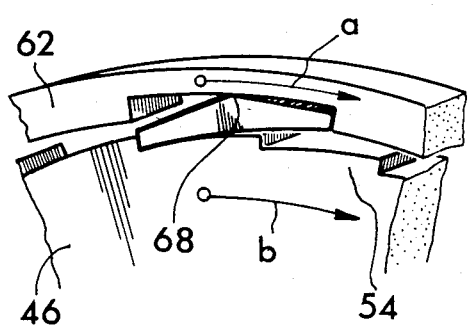
FIG. 4 illustrates a further enlarged perspective view of a detail of the arrangement of FIG. 2.

Formed at the inner side or surface of the clutch star 56 is a pawl support or carrier 62 which possesses a plurality of recesses 64, in the illustrated exemplary embodiment five such recesses 64, each accommodating a respective pawl or pawl member 66. These pawls 66 are each provided at their outer side or surface with a respective edge 68, as best seen by referring to FIG. 4, by means of which they bear at the pawl support 62 and about which edge they can be tilted or pivoted in a balance or rocker-like fashion. Each pawl or pawl member 66 has operatively associated therewith a suitable resilient element, here a spring 70, one of which has been shown in FIG. 3, which strives to allow the pawls 66 to engage with the pawl teeth 54 of the screw socket or screw socket member 48.

The drive machine 12 is not reversible, thus possesses a continuously constant direction of rotation, so that also the normally driving first drive shaft 20, and along therewith the clutch star 56, with the drive machine 12 operating, always rotates in a predetermined direction which has been designated by the arrow a in FIG. 3. The forward rotational direction of the normally driven second shaft 24, and thus also the power take-off side clutch half 40, has been designated by the arrow b in FIG. 3. If the first drive shaft 20 rotates in the direction of the arrow a more rapidly than the second driven shaft 24, then the pawls or pawl members 66 ratchet away over the pawl teeth 54. The same is true when the second driven shaft 24 is stationary or rotates rearwardly or in the reverse direction, in other words opposite to the direction of the arrow b. The pawls or pawl members 66 only then engage or latch with the pawl teeth 54 if—by throttling the drive machine 12 and/or by actuating the brake 18—the first shaft 20 has been braked to such an extent that it is in the process of being overtaken by the second shaft 24. In such case the pawl members 66 exert a braking torque or rotational moment upon the screw socket 48 which strives to displace the screw socket 48 out of the position depicted at the upper half of the illustration of FIG. 2 into the position shown at the lower half of such FIG. 2.

The clutch star 56 engages with its pawl support 62 over the pawl teeth 54 in a manner such that the screw socket 48 and the clutch star 56, apart from a slight axial play between both these elements, are only conjointly displaceable in the axial direction. Thus, when the screw socket 48, starting from the position shown at the upper half of FIG. 2, has been threaded further into the helical teeth 44, then it entrains the clutch star 56, so that its straight teeth 60 begin to engage with the internal teeth 42 of the power take-off side clutch half 40. However, at that moment in time the pawl blocking device composed of the pawl teeth 54, the pawl support or carrier member 62 and the pawls 66, becomes ineffective, so that the engagement operation must be completed with other facilities or means as will be described more fully hereinafter.

A suitable fluid medium, typically oil is infed to the recesses 64 by not particularly illustrated feed bores or the like, which damps the movement of the pawls or pawl members 66 when such are ratcheting over the pawl teeth 54. Dam-up discs 72 or equivalent structure are arranged to both sides of the pawl teeth 54. These dam-up discs 72 hinder the outflow of the oil, and thus, cause a dam-up or back-up of the oil which partially fills the recesses 64 and the tooth gaps or spaces of the pawl teeth 54.

The clutch star or star member 56, in its disengaged position shown at the upper half of the illustration of FIG. 2, is guided and centered in relation to the drive-side clutch half 36 by the mutual meshing of the teeth 38 and 58. In order to still further improve upon such guiding and centering action, the clutch star 56 possesses a cylindrical guide projection or extension 74 which, in the disengaged position of the clutch star 56, is guided in a cylindrical inner surface 76 formed at the drive-side clutch half 36. Upon engagement of the clutch star 56 the guide projection or extension 74 disengages from the inner surface 76 at that moment in time when the teeth 60 of the clutch star 56 begin to engage with the teeth 42 of the power take-off side clutch half 40.

The clutch star 56 is connected with a servomotor 82 by means of a substantially ring-shaped guide or guide means 78 defining an annular groove formed at its outer surface and a substantially U-shaped or circular shift fork or yoke member 80 mounted in such guide means 78. The shift yoke member 80 includes or is connected with conventional linkage means, such as a clevis-ended stub shaft 81 and a clevis pin 83, for engaging a piston rod 85 of the servomotor 82. Other conventional linkage means may also be employed for connecting the clutch star 56 with the servomotor 82.

In the illustrated exemplary embodiment such servomotor 82 is constructed as a hydraulic piston-and-cylinder unit containing a piston 84 and two pressurised fluid medium connections 86 and 86'. The piston 84 has been shown in FIG. 2 in full lines substantially in the position which it assumes when the tooth or jaw clutch 22 is engaged. With broken or phantom lines there has been indicated that position of the piston 84 which substantially corresponds to the disengaged position of the jaw or tooth clutch 22. It will be recognised that the piston 84 controls the pressurised fluid medium connection 86 in a manner such that it only permits a flow of pressurised fluid medium through such pressurised fluid medium connection 86 when it has been shifted out of its end or terminal position substantially shown at the right of FIG. 2, corresponding to the disengaged position of the jaw clutch 22, through a small amount in the sense of engagement of the tooth or jaw clutch, which is accomplished by the described screw-like movement of the screw socket 48. Thus the pressurized fluid medium does not initiate engagement of the tooth or jaw clutch 22, but only effects completion of an engagement initiated by the joint action of the pawl blocking device and the screw socket 48 when the first shaft 20 is overtaken in speed by the second shaft 24.

The pressurised fluid medium connections 86 and 86' are selectively connected by means of a control valve 88 or equivalent structure with a pump 90 and a pressurised fluid medium container or receptacle 92. Between the pump 90 and the control valve 88 there is arranged an accumulator 94, which in the illustration of FIG. 2 has been shown as an accumulator possessing a gas cushion, but also could possess an energy storage in the form of a mechanical spring arrangement. Arranged between the pump 90 and the accumulator 94 is an adjustable pressure limiting valve 96, so that within the attainable feed capacity of the pump 90 there can be adjusted the pressure built-up by such pump 90, and thus the energy which can be stored in the accumulator 94 for a given size of such accumulator.

In the illustrated position of the control valve 88 the pressure prevailing in the servomotor 82 ensures that the tooth or jaw clutch 22 remains engaged as shown in the lower half of FIG. 2. However, if the control valve 88 is switched in the sense of the arrow c, then the chamber at the right-hand side of the servomotor 82 in the illustration of FIG. 2, is vented from the pressurised fluid medium, whereas its entire pressure now is effective at the left-hand chamber or compartment and the piston 84 together with the clutch star 56 and the screw socket 48 are moved in the disengagement direction. This occurs in a sudden fashion, since the accumulator 94 makes available a sufficient quantity of pressurised fluid medium at the adjusted pressure. Only after the piston or piston member 84 has begun to cover the pressurised fluid medium connection 86, and thus, hinder or retard the further escape of pressurised fluid medium out of the right-hand chamber of the servomotor 82 of the showing of FIG. 2, does there occur a terminal position damping.

The operation of the tooth or jaw clutch 22 will now be explained in relation to FIG. 2. When the tooth or jaw clutch 22 is in engagement, the first drive shaft 20 and the second driven shaft 24 are necessarily rotating at equal speeds. As previously mentioned, when effecting disengagement of the tooth or jaw clutch 22, the driving force of the turbine 12 or the propulsion load of the first drive shaft 20 is reduced in order to avoid damage to the second set of straight teeth 60 and the straight teeth or straight tooth system 42. As previously explained, disengagement must nevertheless be effected under at least partial load to prevent spontaneous re-engagement due to speed fluctuation.

To initiate disengagement, the control valve 88 is momentarily moved in the direction c in FIG. 2. That is, the pressurized fluid medium connections 86 and 86', which are initially open to the accumulator 94 and, respectively, the receptacle 92, are switched by the control valve 88 to be terminally open to the receptacle 92 and, respectively, the accumulator 94. Thus the accumulator 94 can rapidly discharge through the left-hand straight-through passage portion 88a of the control valve 88 and through the pressurized fluid medium connection 86' into the left-hand chamber of the servomotor 82 to urge the piston 84 to the right in FIG. 2. The piston 84 entrains with it the piston rod 85, the connecting or clevis pin 83 and the stub shaft 81 or equivalent structure in the same direction.

This or other suitable conventional linkage means engages the shift yoke member 80 which is seated in groove means upon the clutch star 56 defined by annular guide means 78 and entrains the clutch star 56 also in the same direction, which is the direction of disengagement. As the clutch star 56 is entrained to the right, the second set of straight teeth 60 is withdrawn from engagement with the straight gear teeth or straight tooth system 42, thus effecting disengagement of the tooth or jaw clutch 22. As the piston 84 approaches the right-hand end of the servomotor 82, it begins to obturate the pressurized fluid medium connection 86 and thereby hinder or retard exhaust of the pressurized fluid medium from the right-hand chamber of the servomotor 82, thus producing a desirable damping effect at the end of the piston stroke. When the piston 84 has reached the right-hand end of its stroke within the servomotor 82, it fully obturates the pressurized fluid medium connection 86, as will be seen in FIG. 2, thus preventing re-entry of the pressurized fluid medium.

At this point, the left-hand chamber of the servomotor 82 is still connected with the accumulator 94 through the pressurized fluid medium connection 86' and the left-hand straight-through passage portion 88a of the control valve 88. That is, the control valve 88 is still in its right-hand position. Maintaining the left-hand chamber of the servomotor 82 under pressure in this manner would prevent re-engagement of the tooth or jaw clutch 22. If the rotational speed of the first drive shaft 20 were allowed to fall below the rotational speed of the second driven shaft 24, the automatic engagement initiated by the combined action of the pawl blocking device and the screw socket 48 would act counter to this pressure in such left-hand chamber. In order to avoid such a conflict, the control valve 88 is returned to its left-hand position when disengagement has been completed. In other words, the control valve 88 is momentarily moved in a direction c to effect a rapid disengagement of the tooth or jaw clutch 22 and is then returned to its initial position in order to permit later re-engagement.

Since the piston 84 is now obturating the pressurized fluid medium connection 86, the connection of such pressurized fluid medium connection 86 through the right-hand crossed-passage portion 88b of the control valve 88 to the accumulator 94 has no effect on the servomotor 82. In this position, however, the full pressure of the accumulator 94 is present at the pressurized fluid medium connection 86 and can become effective in the servomotor 82 as soon as the screw socket 48 initiates re-engagement and entrains the piston 84 to expose at least part of the pressurized fluid medium connection 86.

The tooth or jaw clutch 22 is now disengaged and is in the position illustrated in the upper half of FIG. 2. It is ready for re-engagement as soon as the rotational speed of the first drive shaft 20 falls below that of the second driven shaft 24. As long as the second driven shaft 24 is rotating slower than the first drive shaft 20 the tooth or jaw clutch 22 will remain disengaged. The tooth or jaw clutch 22 will also remain disengaged if the second driven shaft 24 is turning in reverse. In this state, the control valve 88 is in its left-hand position and there is no pressure effective in either chamber of the servomotor 82.

The tooth or jaw clutch 22 will only be in the disengaged state when the rotational speed of the first drive shaft 20 is greater than the rotational speed of the second driven shaft 24. In order to effect engagement of the tooth or jaw clutch 22 from this state, the first drive shaft 20 must be reduced in speed either by slowing the drive turbine 12 or by applying the brake 18 to the first drive shaft 20. If the second driven shaft 24 is stationary or is turning in reverse, it will be necessary to regulate the fluid coupling 26 or the torque converter 120 to effect a forward rotation.

In this state, the control valve 88 will be in its initial, left-hand position and no pressure will be effective within the servomotor 82. Since the piston 84 is obturating the pressurized fluid medium connection 86, the pressurized fluid emanating from the accumulator 94 is applied to the pressurized fluid medium connection 86 without being able to enter the right-hand chamber of the servomotor 82.

When the rotational speed of the first drive shaft 20 falls to that of the second driven shaft 24, a pawl 66 of the pawl blocking device will engage a pawl tooth 54 of the screw socket 48 and for an instant the first drive shaft 20, the tooth or jaw clutch 22 and the second driven shaft 24 will all rotate at the same speed. As the rotational speed of the first drive shaft 20 falls still further and tends to become less than that of the second driven shaft 24, the ensuing relative rotation will cause the helical tooth system 44 to entrain the screw socket 48 to the left in FIG. 2. Since the screw socket 48 in turn entrains the clutch star 56 with it, the second set of straight teeth 60 will begin to engage the straight gear teeth or straight tooth system 42. Since the screw socket 48 controls, through the intermediary of the linkage members 81, 83 and 85, the servomotor 82, the initial travel of the engagement motion entrains the piston 84 slightly to the left in FIG. 2, thereby exposing the pressurized fluid medium connection 86 which is connected through the right-hand crossed-passage portion 88b of the control valve 88 to the accumulator 94. This permits the accumulator 94 to rapidly discharge into the right-hand chamber of the servomotor 82, thereby rapidly completing the engagement motion and maintaining the tooth or jaw clutch 22 firmly in engagement. The tooth or jaw clutch 22 is now in the position illustrated in the lower half of FIG. 2.

Although the control valve has been described as a member having a left-hand portion 88a and a right-hand portion 88b and being moved in the direction c, which corresponds for instance to a piston-type transfer or reversing valve, it will be understood that any suitable type of control valve may be employed such as, for instance, a rotary control valve performing the same function of reversing the connections between the pressurized fluid medium connections 86, 86' and the associated accumulator 94 and receptacle 92.

The fluid coupling 26 is of conventional construction and therefore need not here be discussed in any great detail. In FIG. 1 there will be recognised that the fluid coupling 26 possesses a primary coupling part or component 100 connected with the first drive shaft 20 and a secondary part or component 102 connected with the second driven shaft 24 as well as a rim of radially adjustable guide vanes 104. These guide vanes 104, in their depicted radial inner position, cause a reversal in the direction or fluid flow, so that with the tooth jaw clutch 22 disengaged the fluid or hydraulic coupling 26 drives the second shaft 24 in a rotational direction which is opposite to that of the first shaft 20. The guide vanes 104 can be shifted out of the depicted position into a position where the fluid or hydraulic coupling 26 transmits the movement imparted by the shaft 20 to its primary part 100, by means of the secondary part 102, in the same sense or direction to the second shaft 24. As long as the jaw or tooth clutch 22 remains disengaged there is always present in the fluid coupling 26 a certain load-dependent slip, so that the second shaft 24 rotates somewhat more slowly than the first shaft 20.

Figures 5A, 5B:
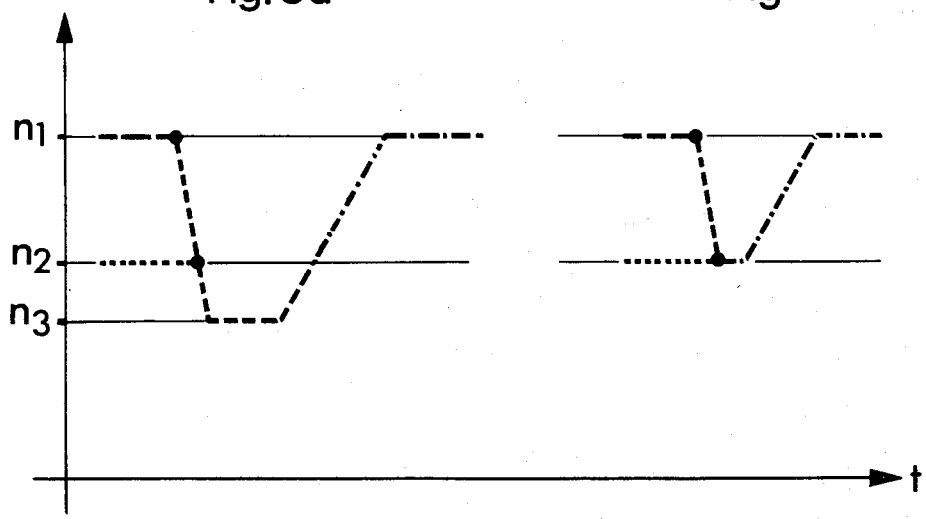
FIG. 5a is a diagram showing the course of the rotational speed as a function of time with a prior art clutch arrangement of the marine vessel drive illustrated in FIG. 1.
FIG. 5b illustrates a corresponding diagram for the inventive clutch arrangement.

This condition has been depicted in FIGS. 5a and 5b, wherein the rotational speed of the first shaft 20 has been designated by reference character n1, and the rotational speed of the second shaft 24 by reference character n2. In FIG. 5a there has been portrayed the further course of the rotational speed as a function of time t for the case where, there has been installed, instead of the tooth or jaw clutch 22 and for comparable clutch arrangements, a conventional synchronizing tooth or jaw clutch. The further course of the rotational speed n1 during synchronization and engagement of the jaw clutch has been shown with broken lines, the further course of the rotational speed n2 with a dotted line, and finally, the common rotational speed of the first shaft 20 and the second shaft 24 with a chain-dot line. It will be apparent that the use of a conventional tooth or jaw clutch necessitates, for the reasons previously discussed, braking the first shaft 20 to a rotational speed n3 prior to engagement of the known tooth or jaw clutch, this last-mentioned rotational speed lying appreciably below the original rotational speed n2 of the second shaft 24.

This known rotational speed course for FIG. 5a has been contrasted in FIG. 5b with the rotational speed course which arises by virtue of the installation of the inventive jaw clutch 22 in the clutch arrangement of this development. In this case, the rotational speed of the first shaft 20 only drops to the original rotational speed n2 of the second shaft 24, and already at that point there occurs the synchronization and the engagement of the tooth or jaw clutch 22. Consequently, the marine vessel drive or propulsion system illustrated in FIG. 1 can run-up again directly from the rotational speed n2, so that the required time needed for the engagement of the tooth or jaw clutch and the renewed attainment of the original drive rotational speed and now also the power take-off rotational speed n1 is appreciably smaller than during the engagement operation illustrated in FIG. 5a.

Figure 6:
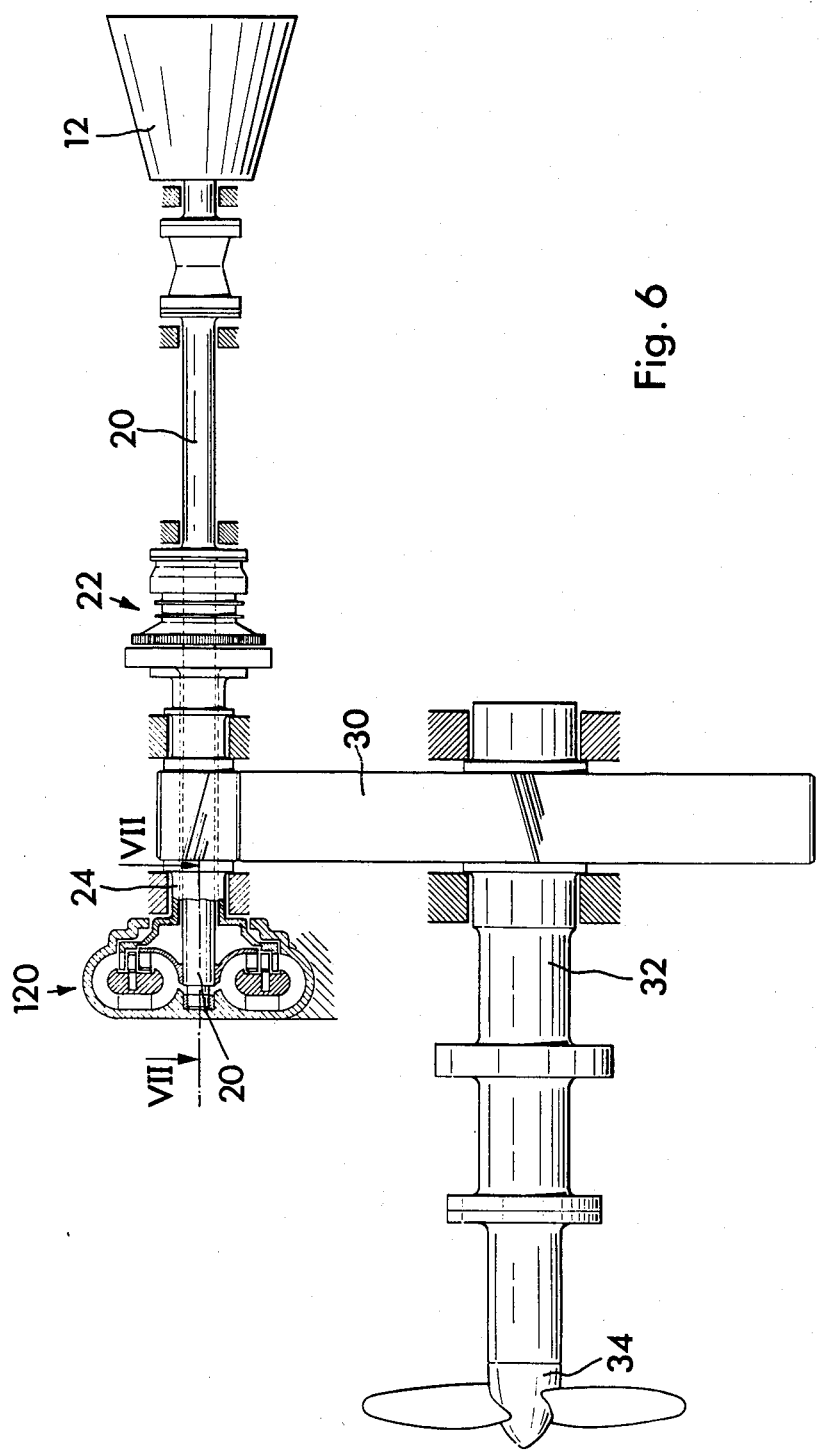
FIG. 6 is a top plan view of a marine vessel drive containing a torque converter and shown partially in longitudinal sectional view.
Figure 7:
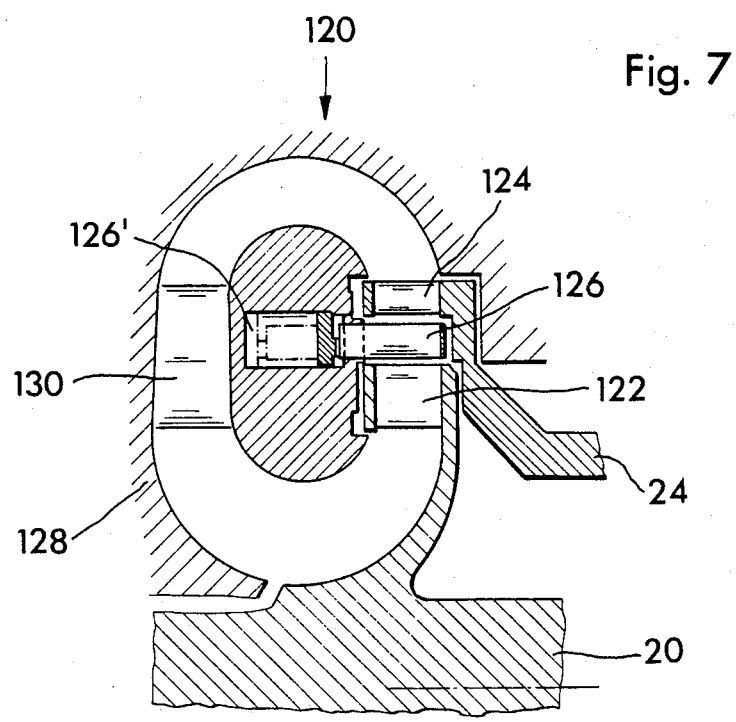
FIG. 7 is an enlarged longitudinal sectional view of the arrangement of FIG. 6, taken substantially along the line VII—VII thereof, and illustrating further details.

With a marine vessel drive according to the illustration of FIGS. 6 and 7 there is provided a fluid or torque converter 120 instead of the fluid or hydraulic coupling. Belonging to the torque converter 120 is a primary part or component 122 connected with the first drive shaft 20, a secondary part or component 124 connected with the second driven shaft 24, a rim of reversal vanes 126 and a stationary, non-rotating housing 128 having a rim of stator vanes 130. The reversing vanes 126 can be axially retracted into a position 126' at the center of the torque converter 120 and externally of the flow medium path. Such construction of possibly employed torque converter has been disclosed, for instance, in German Patent Publication No. 3,022,075 published Jan. 8, 1981.

Figure 8:
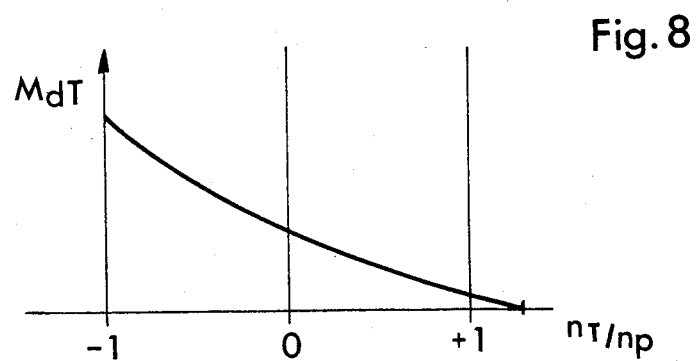
FIG. 8 is a diagram illustrating the characteristics of the torque converter of the arrangement of FIG. 6.

The torque converter 120 is designed such that, according to the graph of FIG. 8, the output torque $M_{dT}$ at the secondary part 124 does not drop to null until the rotational speed ratio $n_T/n_P$ between the secondary part and the primary part becomes greater than 1. Consequently, there is achieved the result that the synchronizing jaw or tooth clutch 22 can engage without the first shaft 20 having to be braked either by the drive machine 12 or by the brake 18.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. A clutch arrangement for a marine vessel drive comprising:
a normally driving first drive shaft;
a normally driven second shaft;

a synchronizing tooth clutch;

a fluid flow device having a primary part and a secondary part;

said tooth clutch having a first tooth clutch half located at a drive side and a second power take-off tooth clutch half located at a driven side;

said first shaft being connected with said drive-side first tooth clutch half of the synchronizing tooth clutch and with the primary part of the fluid flow device and with said normally driven second shaft;

said normally driven second shaft being connected with the power take-off side tooth clutch half of the tooth clutch and with the secondary part of the fluid flow device;

said tooth clutch possessing a clutch star;

said clutch star having a first set of teeth;

said clutch star being axially displaceable by means of the first set of teeth upon one of the tooth clutch halves by continuous meshing of the teeth;

said clutch star being provided with a second set of teeth for enabling engagement of the clutch star with the second tooth clutch half;

a pawl blocking device supported by said clutch star;

said pawl blocking device upon passing through a synchronous rotational speed engaging and causing a screw-like relative movement between two components of the tooth clutch which causes the engagement of the clutch star;

the first set of teeth of the clutch star comprising straight teeth;

a screw socket threadably connected with the second tooth clutch half;

said screw socket and said pawl blocking device being connected as a unit with the clutch star for conjoint axial displacement;

a servomotor controlled by the screw socket for continuing the engaging movement of the clutch star;

means connecting the screw socket with said servomotor; and said pawl blocking device being arranged such that it engages when the rotational speed of the drive-side first tooth clutch half, during normal forward direction of rotation is about to drop below the rotational speed of the power take-off side second tooth clutch half.

2. The clutch arrangement as defined in claim 1, wherein:

said fluid flow means comprises a fluid coupling.

3. The clutch arrangement as defined in claim 1, wherein:

said fluid flow means comprises a torque converter.

4. The clutch arrangement as defined in claim 1, further including:

an accumulator arranged forwardly of said servomotor; and said accumulator storing a quantity of energy sufficient for accomplishing a sudden disengagement of said tooth clutch during partial load operation of the clutch arrangement.

5. The clutch arrangement as defined in claim 1, wherein:

said second set of teeth of the clutch star possesses a diameter which is greater by 50 to 150% than the diameter of said first set of teeth.

6. The clutch arrangement as defined in claim 5, wherein:

said greater diameter is larger by 80 to 120%.

7. The clutch arrangement as defined in claim 1, wherein:

said fluid flow device comprises a reversible torque converter; and said pawl blocking device contains pawls, pawl teeth and structure for damming-up oil in order to damp the movement of the pawls when such ratchet over the related pawl teeth.

8. The clutch arrangement as defined in claim 7, wherein:

said pawls ratchet over said pawl teeth during reverse rotation of said second shaft.

9. The clutch arrangement as defined in claim 7, wherein:

said structure of said pawl blocking device for causing oil dam-up comprises dam-up discs arranged to both sides of said pawl teeth for damming-up the oil.

10. The clutch arrangement as defined in claim 1, further including:

brake means arranged at said normally driving first drive shaft.

* * * * *

UNITED STATES PATENT AND TRADEMARK OFFICE
CERTIFICATE OF CORRECTION

PATENT NO. : 4,489,816

DATED : December 25, 1984

INVENTOR(S) : HANS SIGG

It is certified that error appears in the above-identified patent and that said Letters Patent is hereby corrected as shown below:

In the Abstract, line 10, please delete "Threadably" and insert —A screw socket threadably—

In the Abstract, line 15, after "causing" please delete "of"

In the Abstract, line 11, please delete "a" (first occurrence)

Column 1, line 11, after "a" please insert —first—

Column 1, line 12, please delete "first"

Column 1, line 25, before "pawl" (1st occurrence) please insert —ratchet or—

Signed and Sealed this

Twenty-fourth Day of September 1985

[SEAL]

Attest:

DONALD J. QUIGG

Attesting Officer

Commissioner of Patents and Trademarks—Designate